Patented July 31, 1951

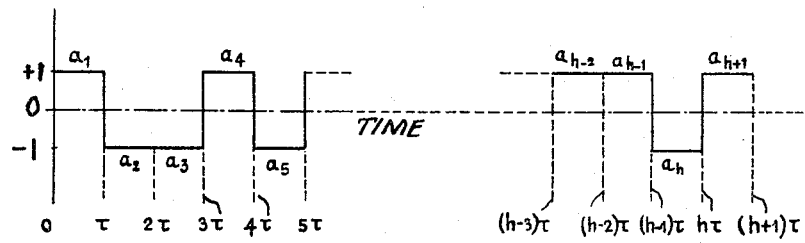
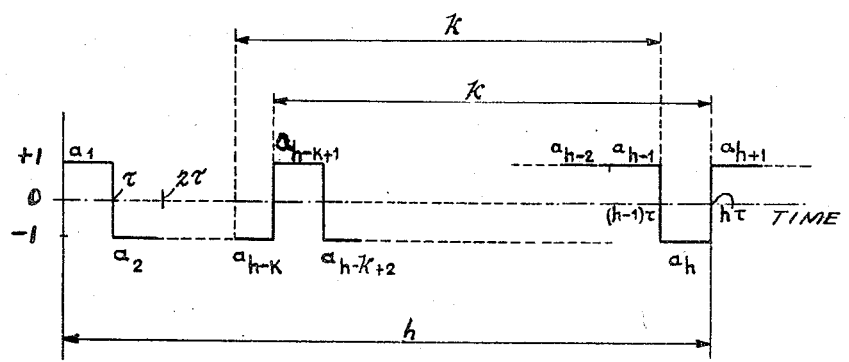

2,562,761

UNITED STATES PATENT OFFICE 2,562,761

DEVICE FOR MEASURING THE INDEX-NUMBER OF A TELEGRAPHIC MODU-LATION

Honoré M. Bayard, Meudon, and Raymond J. C. Roquet, Clamart, France

Continuation of abandoned application Serial No. 739,216, April 3, 1947. This application May 16, 1949, Serial No. 93,618. In France January 9, 1946

Section 1, Public Law 690, August 8, 1946
Patent expires January 9, 1966

6 Claims. (Cl. 178—69)

This application is a continuation of our co-pending application, Ser. No. 739,216, filed April 3, 1947, which is now abandoned.

The present invention relates to telegraph signal transmission, and, in particular, to a device for measuring a quantity which is a characteristic of the particular train of signals being sent over a telegraph line at a given time, this quantity being called the "index number." The signals to be considered are equal length two-value code signals, that is, a train of signals of which every signal element has one of two determined values, as plus unity or minus unity.

The invention will be understood from the following description and the accompanying drawings, wherein:

Fig. 1 shows a particular sequence or train of signal elements constituting part of a transmitted message, in which each element is plus unity or minus unity;

Fig. 2 shows another sequence of signal elements, and how the quantities are determined that are used in the measurement of the characteristics of the signal sequence or train;

Figure 4:
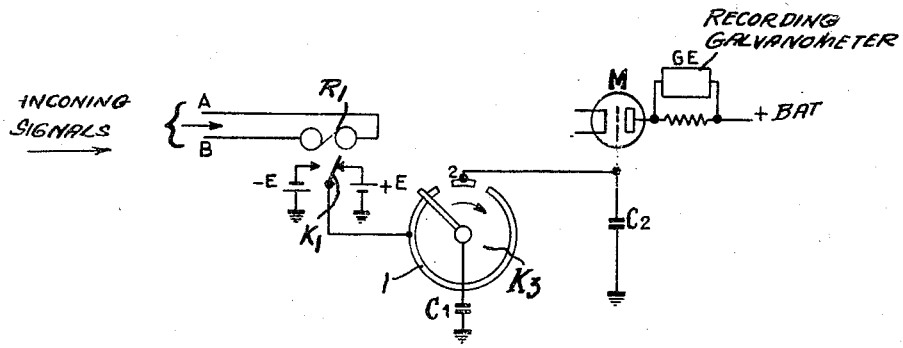
Figure 5:
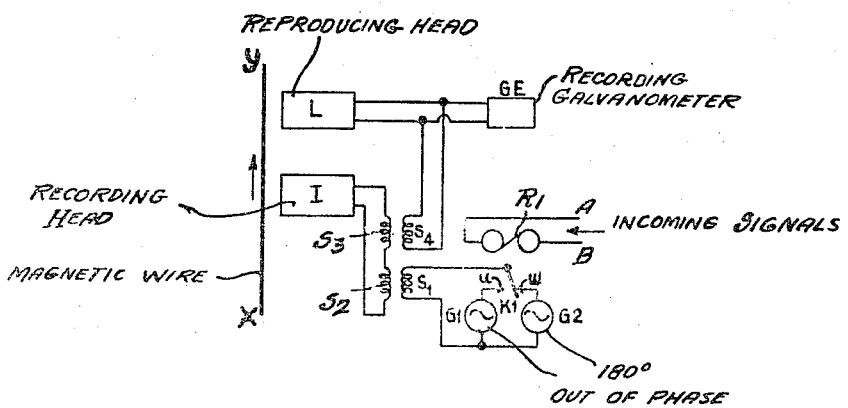

Fig. 4 is a circuit diagram of a simplified arrangement also using condensers and a rotary distributor, but only one relay, for measuring the index number without any limitation as to the number of preceding signals to be taken into consideration; and Fig. 5 is a circuit diagram of an arrangement using one relay and out-of-phase alternating current generators and a wire recorder to measure the index number without any limitation as to the number of preceding signals to be taken into consideration.

The International Telegraph Consultative Committee, at its Brussels meeting, proposed the following definition for characteristics of the "modulation" or signal sequence of a telegraph system:

"1. The rate of formation of the signals shall be called modulation rate or telegraph speed, and shall be measured in 'bauds' by the reciprocal of the duration in seconds of the unit interval.

"2. The beginning of a signal element shall be known as characteristic instant."

Further, the same committee inserted in the reports of its Brussels Convention the following recommendation concerning the index number of a telegraph modulation:

"We have to define a parameter called 'modulation index-number,' which will make it possible to characterize clearly and unambiguously any modulation up to the characteristic instant under consideration. (Only two position telegraph modulation is considered, though the proposed definition should be such as to admit of its extension to three position telegraph modulation.)

"We know that each element of a modulation can be characterized by a number equal to $-1$ or $+1$ according as the element is a spacing or a marking transmission. A succession $a_n$, $a_m$, ... $a_h$, ... $a_0$ of $n+1$ numbers, of which some equal $-1$ and the others $+1$, is an unambiguous definition of a modulation composed of $n+1$ elements disposed between the instant $-nt$, representing the beginning of the element characterized as $a_n$, and the instant zero, representing the element characterized as $a_0$. The index number for this modulation is the quantity represented by $$m = \frac{a_n}{2^n} + \frac{a_{n-1}}{2^{n-1}} \cdots + \frac{a_h}{2^h} \cdots \frac{a_1}{2} + a_0$$

"It is easy to see that this number $m$ meets our requirements inasmuch as it defines clearly and unambiguously any given completed modulation. It has the following easily recognized properties:

"1. Two different number indices correspond to two different finite modulations (i. e. comprising a finite number of elements);

"2. The number thus defined is included between $-2$ and $+2$ if one takes into account infinite modulations, i. e. modulations comprising an infinite number of elements before the element $a_0$;

"3. One, and only one, infinite modulation corresponds to any number between $-2$ and $+2$;

"4. One, and only one, finite modulation corresponds to any fractional number between $-2$ and $+2$ whose denominator is a power of 2;

"5. It is observed that an infinite modulation corresponds likewise to such a number;

"6. An index number included between 0 and $+1$ corresponds to any modulation terminating at zero instant by an alternation from 'rest' to 'work' ($a_0 = +1$, $a_1 = -1$)."

For greater convenience of the following explanation, slightly different notations will be adopted than that just quoted from the C. C. I. T. recommendations, and $a_i$ will designate the farthest back preceding signal considered while $a_h$ will denote the most recent signal immediately preceding the signal being received.

Now consider the end of a line whereon a two-value telegraph current is being received. This current, in general, causes the movement of the armature of a telegraph relay; the successive positions of this armature constitute an uninterrupted sequence of signals each of a substantially equal duration, $\tau$, and which are either "work" or marking signals or "rest" or spacing signals. Each one of such successive signals will be designated by $a_1, a_2 \ldots a_h, a_{h+1}$.

The values $a_1, a_2 \ldots$ will be called the signal "parameter."

If a signal is a work or marking signal, by definition $a=+1$; if it is a "rest" or spacing signal, $a=-1$.

Consider now the diagram of Figure 1, which represents an example of a signal modulation received on a telegraph line. At time $\tau$, from zero time signal $a_1$, which is a marking signal, has just been received, therefore $$a_1=+1$$

At the next characteristic instant, $2\tau$, there has been received, in addition to signal $a_1$, a signal $a_2$ which is a spacing signal (Fig. 1). From the above definition, the index number which characterizes the telegraph signal modulation consisting of the two successive signals $a_1$ and $a_2$ is:

$$i_2 = a_2 + \frac{a_1}{2} = -1 + \frac{+1}{2} = -0.5$$

At the next characteristic instant, $3\tau$, the three successive signals $a_1, a_2, a_3$ have been received. The index number which corresponds to this signal modulation is $$i_3 = a_3 + \frac{a_2}{2} + \frac{a_1}{2^2} = -1 + \frac{-1}{2} + \frac{+1}{4} = -\frac{5}{4} = -1.25$$

It is to be noted that $$i_3 = a_3 + \frac{a_2 + \frac{a_1}{2}}{2} = a_3 + \frac{i_2}{2}$$

At the next characteristic instant, $4\tau$, we should have $$i_4 = a_4 + \frac{a_3}{2} + \frac{a_2}{4} + \frac{a_1}{8} = +1 - \frac{1}{2} - \frac{1}{4} + \frac{1}{8} = +\frac{3}{8} = 3.75$$

It will be noted that $$i_4 = a_4 + \frac{i_3}{2}$$

When $h$ signals have thus been received on the line, that is after a time $h\tau$ after the beginning of the signal modulation train, we have the index number:

$$i_h = a_h + \frac{a_{h-1}}{2} + \frac{a_{h-2}}{2^2} + \ldots + \frac{a_2}{2^{h-2}} + \frac{a_1}{2^h}$$

After reception of the next signal, i. e. after a time $(h+1)\tau$, the index number becomes:

$$i_{h+1} = a_{h+1} + \frac{a_h}{2} + \frac{a_{h-1}}{2^2} + \ldots + \frac{a_2}{2^h} + \frac{a_1}{2^{h+1}}$$

By comparing these two expressions, it is seen that $$i_{h+1} = a_{h+1} + \frac{i_h}{2}$$

Thus the value of the index number at the time when a given signal of a train ends, is equal to half the value of the index number at the time when the immediately previous signal ended, increased by the value of the parameter $a$ of the said given signal as above defined.

In other words, if the index number of a modulation or signal train, is known, obtained by taking into account all the signals received since the beginning of the modulation or signal train, it is necessary, to know the index number of this modulation or signal train when the next signal has been received, to take half the index number already known and to add to it the parameter $a$ of the immediately preceding signal received.

It will be seen that in the expression of the index number $i$ as just calculated, the terms become smaller and smaller as they correspond to farther and farther back signals, i. e. as they have been received a longer time before the instant of reception of the most recent signal. Therefore, in numerous cases, one can neglect the remotest terms and take into account only the terms corresponding to a certain number $k$ of the immediately preceding signals received, i. e. the signals which precede immediately the instant at which it is desired to know the index number.

Under such conditions, instead of taking into account, in the determination of the index number at a given instant, all the signals which have been received from the beginning of the modulation or train of signals up to said instant, a number which, obviously, increases constantly as new signals are received, account is taken only of a fixed number of signals which occur before a given instant, i. e. a constant number of the immediately preceding signals received before said instant.

To illustrate this case, let us refer again to the diagram of Figure 1, and assume that we wish to take into account only three such preceding signals of the train $a_1, a_2, a_3, a_4, a_5$, for the determination of the index number.

At characteristic instant 3, $\tau$ from zero time, the index number $i_3$ will be, as before:

$$i_3 = a_3 + \frac{a_2}{2} + \frac{a_1}{4} = -\frac{5}{4}$$

At characteristic instant 4, $\tau$ from zero time, the index number will be:

$$i_4 = a_4 + \frac{a_3}{2} + \frac{a_2}{4}$$

No account is taken any more of the signal $a_1$, since it is the fourth signal preceding the instant 4, and it has been decided to take account of 3 preceding signals only. This index number has the value $$i_4 = +1 - \frac{1}{2} - \frac{1}{4} = +\frac{1}{4} = +0.25$$

At instant 5 the index number will be $$i_5 = a_5 + \frac{a_4}{2} + \frac{a_3}{4}$$

No more account is taken of signals $a_1$ and $a_2$. The value of $i_5$ is $$-1 + \frac{1}{2} - \frac{1}{4} = -\frac{3}{4}$$

Generally, if at a given instant, $(h-1)$ signals have been received on the line since the beginning of the modulation, or signal train, but if account is taken only, for the determination of the index number, of the $k$ signals which precede said instant, the index number at that instant has the value $$i_{h-1} = a_{h-1} + \frac{a_{h-2}}{2} + \frac{a_{h-3}}{2^2} \ldots + \frac{a_{h-k+2}}{2^{k-3}} + \frac{a_{h-k+1}}{2^{k-1}} + \frac{a_{h-k}}{2^k}$$

When the next signal has been received on the line, $a_h$, the index number becomes $$i_h = a_h + \frac{a_{h-1}}{2} + \frac{a_{h-2}}{2^2} + \cdots + \frac{a_{h-k+2}}{2^{k-2}} + \frac{a_{h-k+1}}{2^{k-1}}$$

In this new index number, account is taken of the new signal $a_h$ but no account is taken, any more, of the signal $a_{h-k}$.

Figure 2 show a diagram illustrating the train of signals just mentioned.

Comparing these two expressions, it is found that $$i_h = \frac{i_{h-1}}{2} + a_h - \frac{a_{h-k}}{2^k}$$

Thus if one knows, at a given instant $t$ taken as zero time, the index number of a telegraph modulation or train of signals, limited to the $k$ last signals received before that instant, one can obtain the index number corresponding to instant $t+\tau$ at which the next signal is received by halving the known index number corresponding to instant $t$, and by adding this half to the difference between the parameter as above defined of the signal arriving at instant $t+\tau$ and the fraction $\frac{1}{2^k}$ of the parameter of the $k$th signal received before instant $t$.

Thus one can, from one instant to the next, determine the index number of a telegraph modulation or train of signals at any instant, as the signals constituting said modulation are being received.

An object of the present invention is to provide an index number measuring device based on the above remarks, and allowing the recording of the successive values assumed by the index number of a telegraph modulation, as the signals which constitute it are received.

This device of the present invention is characterized in that it comprises means connected at the end of the transmission channel on which the signals are received to record a first voltage $E_1$, proportional to the parameter of a signal received on said channel and of the same sign as said signal; means connected to this channel for recording a second voltage $E_2$, proportional and opposite in sign to the parameter of the $k$th signal preceding the received signal, the absolute value of this second voltage being in the ratio $$\frac{1}{2^k}$$

with the first voltage; means for placing these two voltages in series so as to obtain their sum; means for recording a quantity proportional to said sum; means for reducing said quantity to one-half of its initial value during the interval between the receptions of the two successive signals; means for adding to said half value a quantity proportional to the sum of the two voltages $E_1$ and $E_2$ corresponding to the next received signal, and means for recording the successive values assumed by the sum of said quantities as the signals are received.

The values thus recorded are then proportional to the successive index numbers of the sequence of signals limited to the last $k$ received signals.

If the number $k$ of signals selected for the determination of the index number is large, the voltage recorded, corresponding to the $k$th signal preceding the last signal received, is very small compared to the voltage recorded corresponding to this last signal. The value of the index number limited to $k$ preceding signals is then very close to the value of the index number corresponding to an unlimited number of preceding signals; the difference between these two values may be neglected if a knowledge of the index number is not required with a great precision; this difference may be too small to be detected by the recording galvanometer, anyhow. The device of the present invention may then be simplified by omitting the recording of the voltage corresponding to the $k$th preceding signal and by adding directly to half the quantity corresponding to the previous index number the quantity corresponding to the parameter $a$ of the last signal received as above defined.

Figure 3:
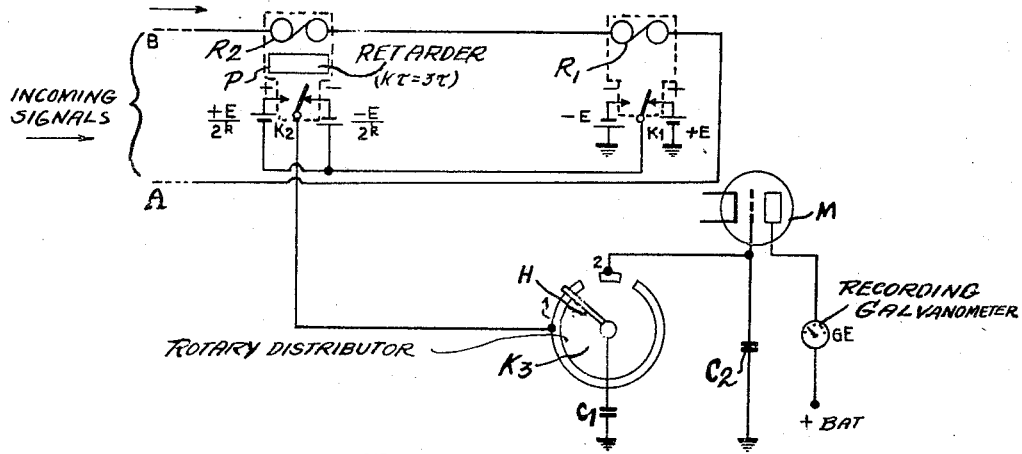
Fig. 3 shows a circuit diagram of an arrangement using condensers and a rotary distributor and two relays, one of which is retarded, for measuring the signal sequence characteristic or "index number" when only a limited number of preceding signals are to be taken into consideration.

In Figure 3, A and B designate the incoming terminals of the transmission channel on which the signals are received, and $R_1$ and $R_2$ are two polarized telegraph relays whose windings are connected in series, between terminals AB. The operation of relay $R_2$ is delayed by an interval $k\tau$ equal to the duration of $k$ signals by any suitable means known to the art, such as magnetic shield P.

The right hand (+) and left hand (−) contacts of relay $R_1$ are connected respectively to the positive and to the negative terminals of two sources of direct current each having a voltage E, designated by +E and −E, the other terminals of these sources being connected to ground.

Similarly, the left hand (+) and right hand (−) fixed contacts of relay $R_2$ are connected respectively to the positive and to the negative terminals of two sources of direct current with a voltage $$\frac{E}{2^k}$$

designated by $$+\frac{E}{2^k} \text{ and } -\frac{E}{2^k}$$

the other terminals of said sources being both connected to the armature $K_1$ of relay $R_1$. The armatures $K_1$ and $K_2$ of relays $R_1$ and $R_2$ are shown in the positions they assume when a positive signal is applied.

$K_3$ designates a rotary distributor the brush H of which rotates at the rate of one revolution during the duration $\tau$ of one signal, and which comprises a long conducting sector 1 and a short conducting sector 2 separated by insulating intervals.

The armature $K_2$ of relay $R_2$ is connected to sector 1 and the brush B is connected to one terminal of a condenser $C_1$ the other terminal of which is grounded. Finally, the short sector 2 is connected to one terminal of a second condenser $C_2$ whose other terminal is grounded, and to the grid of a three-electrode amplifier tube M in the anode circuit of which a recording galvanometer GE is connected. Condensers $C_1$ and $C_2$ have the same capacitance.

The operation of this device of Fig. 3 is as follows:

It will be assumed, in what follows, that the application of a positive signal to the windings of the polarized relays $R_1$ and $R_2$ brings their armatures on to their right hand contacts.

It will also be assumed, by way of example, that the train of signals received is that represented in Figure 1, and that the number $k$ of preceding signals taken into account for the determination of the index number is equal to 3.

When the first signal, whose "parameter" (as above defined) is $a_1=+1$, reaches, at the instant designated zero, the end of the transmission channel, relay $R_2$ by virtue of its delay action, does not operate, and it is assumed for the present discussion that its armature $K_2$ is on a third contact (not shown) directly connected to sector I of the distributor $K_3$; as will be seen later, this third contact is not indispensable and may be omitted in practice, causing a slight error in the index number of the first signals, an error which rapidly becomes negligible. This third contact results in by-passing the sources $$+\frac{E}{2^k} \text{ and } -\frac{E}{2^k}$$

As to relay $R_1$, its armature $K_1$ is thrown onto its right hand contact and is raised to potential $a_1E=+E$. Assuming that armature $K_2$ is on the just mentioned third contact directly connected to sector I of switch $K_3$, this potential is applied to sector I of the switch $K_3$ and, by brush B to the condenser $C_1$ which takes on a momentary charge $Ca_1E=+CE$.

When brush E rotates and reaches contact 2, the condenser $C_1$ is placed in parallel with the condenser $C_2$ having an equal capacity. The condenser $C_2$ takes on a charge $$Q_2=\frac{a_1CE}{2}$$

which is proportional to the index number $i_1$ of the first signal $a_1$ since, this signal not being preceded by any other, its index number $i_1$ is necessarily equal to its parameter $a_1$. Thus one has, after the charges divide, for the charge of condenser $C_1$, the quantity $$Q_1=\frac{CE}{2}i_1$$

The grid of the tube M is raised to a potential $V_1$, proportional to this charge $Q_1$, and the recording galvanometer GE shows a certain current proportional to this potential $V_1$, supposing the characteristic of the tube to be linear; thus, finally, the registered galvanometer current is proportional to the index number $i_1$.

At instant $\tau$, after the zero instant the second signal, whose parameter as above defined is $a_2=-1$, (Fig. 1) is received by relay $R_1$. The armature $K_1$ of the latter is thrown on to its left hand contact and is raised to the potential $a_2E=-E$ proportional to the parameter $a_2$ of the second signal. It is still assumed that $K_2$ is on its third contact.

This voltage is applied by the sector I and the brush B of rotary distributor $K_3$ to the condenser $C_1$ which takes on a momentary charge of magnitude $Ca_2E$, proportional to the parameter $a_2$. The residual charge $$\frac{CE}{2}i_1$$

on condenser $C_1$ is removed when brush B engages sector 1 for the second time. When the brush B rotates and again comes on to sector 2, this charge $Ca_2E$ combines with the charge $$\frac{a_1CE}{2}$$

which had been received and retained by the condenser $C_2$ during the previous signal and divides into equal parts between condenses $C_1$ and $C_2$ which thus have, each, a total charge $$Q_2=\frac{1}{2}CE\left(\frac{a_1}{2}+a_2\right)$$

which, precisely, from the definition of the index number, is proportional to the index number $i_2$ of the two first signals $a_1$ and $a_2$, that is:

$$Q_2=\frac{CE}{2}i_2$$

the recording galvanometer then registers a new current intensity which is proportional to this new index number $i_2$.

Similarly, when the third signal $a_3=-1$ (Fig. 1) is received by relay $R_1$ from sector I, the condenser $C_1$ takes on a charge $a_3CE=-CE$ and then when the brush B rotates and again comes to sector 2, this charge $a_3CE$ combines with the residual charge $$\frac{1}{2}CE\left(\frac{a_1}{2}+a_2\right)$$

and the whole charge divides equally between condensers $C_1$ and $C_2$ which thus, each have a charge $$Q_3=\frac{CE}{2}\left(a_3+\frac{a_2}{2}+\frac{a_1}{4}\right)$$

which, as can be seen from the definition given of the index number, is proportional to the index number $i_3$ of the three first signals $$Q_3=\frac{CE}{2}i_3$$

The recording galvanometer thus registers a new current intensity proportional to the index number $i_3$. It is still assumed that armature $K_1$ is on its third contact.

The same process of division and accumulation of charges on the condensers would thus be repeated upon the beginning of the reception of each successive signal, the recurrence law above given being observed each time, so that a recording would be obtained of the succession of index numbers relative to the whole train of the received signals, taking into account, each time the whole sequence of these signals if no relay $R_2$ were used. The function of relay $R_2$ which has been used, however, as stated, is to limit the number of the preceding signals which are involved in the determination of the index number.

In the example which has been given, this number of preceding signals has been selected equal to three, so that $R_2$ did not enter into action during the first three signals. It is still assumed that during this interval the armature $K_2$ has remained on its third contact.

Relay $R_2$ thus having its operation delayed for the duration of three signals, when the fourth signal $a_4=+1$ is received by relay $R_1$ at the end of time interval $3\tau$, the relay $R_2$ operates under the action of the first signal $a_1=+1$, and its armature $K_2$ is thrown from its third contact onto its right hand contact where it is raised to a potential $$\frac{-a_1E}{2^3}=-\frac{E}{8}$$

This potential adds algebraically to that of the armature $K_1$ of relay $R_1$, so that the sector I of rotary distributor $K_3$ is raised to a potential $$E\left(a_4-\frac{a_1}{2^3}\right)$$

and the condenser $C_1$ receives a charge $$CE\left(a_4-\frac{a_1}{2^3}\right)$$

This charge is in addition to the residual charge $$Q_3=\frac{CE}{2}i_3$$

as above defined of condenser $C_2$, so that condensers $C_1$ and $C_2$ each have a charge $$Q_4 = \frac{1}{2}CE\left(\frac{i_3}{2}+a_4-\frac{a_1}{2^3}\right)$$

This expression is in good correspondence with the law of recurrence $$i_h = \frac{i_{h-1}}{2}+a_h-\frac{a_{h-k}}{2^k}$$

given above in which $h=4$ and $k=3$.

$$Q_4 = \frac{1}{2}CEi_4$$

thus represents accurately except for the factor ½CE the index number $i_4$ of the modulation or signal train considered at the time of the reception of the fourth signal since the beginning of the transmission, and limited to the last three signals received.

Similarly, at the next characteristic instant at the end of time interval $4\tau$, we would have a charge $$Q_5 = \frac{1}{2}CE\left(\frac{i_4}{2}+a_5-\frac{a_2}{a^3}\right)$$

proportional to the index number $i_5$ and the same will hold for the following signals. The currents registered by the recording galvanometer are thus actually proportional to the succession of the index numbers.

In practice, as already stated, relay $R_2$ of Fig. 3 comprises no third contact directly connected to sector I of rotary distributor $K_3$. The result is that the measurement of the $k$ (three) first index numbers is erroneous, since one adds algebraically to voltage E from relay $R_1$ a voltage $$\frac{E}{2^k}$$

whose sign may be either positive or negative, a priori, inasmuch as the armature of $R_2$ may just as well have been left, at the end of the previous signal transmitted, on either one or the other of its two positions. However, since, the effect of the preceding signals on the value of the index number decreases rapidly according as to how bar back a given signal was applied, this error becomes rapidly negligible. By way of example, if one takes the number of previous signal elements considered $k=3$, the error on the 8th index number measured is smaller than $$\pm\frac{1}{3^2}$$

i. e. at most equal to one quarter of the smallest difference between any two index numbers. Now if the signals are transmitted at a speed of 50 bauds, this eighth signal is received at the end of 160 milliseconds, which is a very small interval. A telegraph speed of fifty bauds corresponds to the use of unit signal elements of uniform duration equal to one-fiftieth of a second. For the subsequent signals the error becomes practically negligible. Hence, the omission of the third contact on relay $R_2$ introduces no serious error.

Figure 4 shows a simplified form of device comprising no relay $R_2$ and introduces no voltage $$\frac{E}{2^k}$$

which gives, consequently, the entire sequence of the index numbers corresponding to all the signals received since the beginning of the signal train transmission, with no limitation to the number of said preceding signals, considered, which limitation exists in the device of Figure 3, to the $k$ immediately preceding signals received as of the time of measurement.

Figure 5 shows a modification, wherein the recording of the quantities proportional to the successive index numbers (relative to an unlimited number of preceding signals) is effected by means of a magnetic wire instead of condensers.

In this Figure 5, A and B designate, as previously, the ends of the transmission channel, and $R_1$ the polarized telegraph relay connected to said channel. The two contacts of this relay are respectively connected to two generators, $G_1$ and $G_2$ which respectively supply alternating currents having between them a phase difference of 180°. One or the other of these two generators, according to the position of the armature $K_1$ of relay $R_1$ supplies, through a transformer having windings $S_1$, $S_2$ the printing coil I of a magnetic wire recording system $xy$. The "reader" printing coil L of this system is placed at such a distance from the coil I along the length of the wire that the point of the wire which has been impressed by printing coil I is, after an interval of time equal to the duration of one signal $\tau$, facing the reading coil L; this reading coil L is then the seat of an induced current proportional and also to the variation of the magnetic condition of the wire $xy$, i. e. to the intensity of the current in the printing coil I which caused this variation. This reading coil L is connected, to a recording galvanometer GE, to a wind $S_4$, coupled on one side with a winding $S_1$ and on the other side with a winding $S_3$ which is in series with a winding $S_2$ coupled to winding $S_1$. The current in the reading coil L is adjusted in such a manner as to be equal to half the current it has been necessary to pass through the printing coil I to cause the magnetic wire to be impressed in desired manner; on the other hand the current sent by the reading coil L through the winding $S_4$ is adjusted so as to be in phase with the current induced in this same winding, by means of $S_1$, by one of the two generators, $G_1$ for example.

The operation of this device is as follows: when a signal is received, the armature $K_1$ of the relay $R_1$ is thrown onto one of the two contacts $u$, $w$, of this relay, according to the polarity of said received signal; the corresponding generator, $G_1$ for instance, is put into circuit and sends into galvanometer GE, through windings $S_1$ and $S_4$, a current of a certain intensity. At this same time, the point of the wire which had been impressed by the action of the preceding signal in applying energy from generator $G_1$ to printing coil I, is facing the reading coil L; it induces in this coil L a current whose value is half that of the current which had been sent into the printing coil I under the action of said preceding signal; this induced current is also sent to the recording galvanometer GE.

This latter thus records the sum of two current intensities: on the one hand a current corresponding to the signal being received, on the other hand half of the value of the current corresponding to the immediately preceding signal; this is the recurrence law indicated above, and the succession of the intensities recorded, provided a calibration has first been effected, gives the sequence of the index numbers.

The magnetic wire could be replaced by any recording device, a film or a disc for instance.

What we claim is:

1. A device for recording the successive values assumed by the index number of a sequence of two-value telegraph signals received at the end of a transmission channel, in step with the reception of said signals, said sequence being limited to the $k$ last signals received, $k$ being a fixed number, this device comprising a first telegraph relay connected to the end of the transmission channel for recording a first voltage $E_1$ proportional to the parameter of the signal received and of the same sign as the latter, a second telegraph relay connected to the end of the transmission channel for recording a first voltage $E_1$ proportional and of opposite sign to the parameter of the $k$th signal preceding the signal being received, this second voltage being in the ratio $$\frac{1}{2^k}$$

with the said first voltage, means for placing the two said voltages in series so as to obtain their sum; means for recording a quantity proportional to said sum, means for reducing said quantity to half its initial value, during the interval between the receptions of two consecutive signals, means for adding to said half a quantity proportional to the sum of the said two voltages $E_1$ and $E_2$ corresponding to the next signal received, and means for recording the successive values assumed by the sum of said quantities in step with the reception of the signals, values which are proportional to the successive index numbers of the signal sequence limited to the $k$ just preceding signals received.

2. A device for recording the successive values assumed by the index number of a sequence of two value telegraph signals, received at the end of a transmission channel, in step with the reception of said signals, said sequence being limited to the $k$ just preceding signals received, $k$ being a fixed number, this device comprising a first condenser, means for applying to said first condenser the sum of two voltages: a first voltage having the same sign as the immediately preceding signal received and a second voltage having a sign opposite to that of the $k$th signal immediately preceding the last preceding signal received, said second voltage being in the ratio $$\frac{1}{2^k}$$

with said first voltage, a second condenser having the same capacitance as said first condenser, means for temporarily insulating said first condenser from said voltage sources during a short time after the reception of each said signal, and for connecting it in parallel with said second condenser and means for recording at each of these parallel connections the maximum potential difference between the terminals of said condensers, said potential difference being proportional to the successive values assumed by the index number of the sequence of the $k$ immediately preceding signals received.

3. In a device for registering the successive values of the index numbers of an incoming received train of two-value telegraph code signals of equal length, a receiving relay having an armature and two fixed contacts, two sources of electrical energy each having one terminal connected to one of said fixed contacts, said two sources having at a given instant voltages of equal magnitude and opposite polarity, a galvanometer having an actuating winding, electrical energy translating means having input terminals connected to said armature and to the second terminals in common of said sources, and further having output terminals connected to the actuating winding of said galvanometer, said electrical energy translating means being adapted to deliver to said output terminals a first electrical current whose electrical characteristics are determined by which one of said fixed contacts is at that instant engaged by said armature, due to the signal then being received, said translating means comprising timed signal storing and modifying means for storing successive signals and adapted at each characteristic instant of the beginning of a new signal interval to halve the record of the signal immediately preceding the signal being received at that instant and to deliver to said output terminals superposed on said first electrical current, a second electrical current whose electrical characteristics are determined by said so halved record of said immediately preceding signal.

4. In a device for registering the successive values of the index numbers of an incoming received train of two-value telegraph code signals of equal length, a receiving relay having an armature and two fixed contacts, a first direct current source having its positive terminal connected to a first said fixed contact, a second direct current source having its negative terminal connected to a second said fixed contact, a timed rotary distributor having a rotating brush and a long contact sector and a short contact sector and making one rotation during the interval of one signal, said long sector being connected to said armature, a first condenser connected between said brush and the second terminals of said sources, a second condenser having the same capacitance as said first condenser connected between said short sector and the second terminals of said sources, a galvanometer having an actuating winding, and amplifying means having its input connected to said short sector and its output connected to the actuating winding of said galvanometer.

5. In a device for registering the successive values of the index numbers of an incoming received train of two value telegraph code signals of equal length, taking into consideration only a definite limited number $k$ of preceding signals, a first receiving relay having an actuating winding and an armature and two fixed contacts, a first direct current source of voltage $E$ having its positive terminal connected to a first said fixed contact, a second direct current source having its negative terminal connected to a second said fixed contact, a second receiving relay having an actuating winding and an armature and two stationary contacts, said actuating windings of said relays being connected in series, said second relay comprising signal retarding means adapted to retard the response of the armature of said second relay to the application of a signal to its winding for a time interval equal to $k$ signal lengths, a third direct current source of voltage $$\frac{E}{2^k}$$

having its positive terminal connected to a first said stationary contact, a fourth direct current source of voltage $$\frac{E}{2^k}$$

having its negative terminal connected to a second said stationary contact, the second terminals of said third and fourth sources being connected in common to the armature of said first relay, a timed rotary distributor having a rotating brush and a long contact sector and a short contact sector and making one rotation during the interval of one signal, said long sector being connected to the armature of said second relay, a first condenser connected between said brush and the second terminals of said first and second sources, a second condenser having the same capacitance as said first condenser connected between said short sector and the second terminals of said first and second sources, a galvanometer having an actuating winding, and amplifying means having its input connected to said short sector and its output connected to the actuating winding of said galvanometer.

6. In a device for registering the successive values of the index numbers of an incoming received train of two-value telegraph code signals of equal length, a receiving relay having an armature and two fixed contacts, two alternating current sources of the same frequency having a phase difference of 180°, each of said sources having one terminal respectively connected to a said fixed contact in such manner that the voltages on said fixed contacts at any given instant are 180° out of phase, a galvanometer having an actuating winding element, a first winding connected between the armature of said relay and the second terminals in common of said sources, a second winding inductively coupled to said first winding, a uniformly traveling magnetic wire, a recording coil and a reproducing coil spaced mutually apart and in magnetic relation to said wire, the spacing between said coils being the distance traveled by a point on said wire during the length of one signal, said second winding being connected to said recording coil, said reproducing coil being connected to the actuating winding element of said galvanometer, and a third winding connected to the actuating winding element of said galvanometer and being inductively coupled to said first winding, the current delivered by said reproducing coil to said actuating winding element being adjusted to be in phase with the current delivered to said actuating winding element by said third winding and of magnitude equal to one-half the magnitude of the current so delivered by said third winding to said actuating winding element.

HONORÉ M. BAYARD.
RAYMOND J. CH. ROQUET.

REFERENCES CITED

The following references are of record in the file of this patent:

UNITED STATES PATENTS

| Number | Name | Date |
|---|---|---|
| 2,477,395 | Sunstein | July 26, 1949 |
| 2,530,839 | Pernic | Nov. 21, 1950 |